(12) United States Patent
McLaughlin et al.

(10) Patent No.: US 11,634,207 B2
(45) Date of Patent: Apr. 25, 2023

(54) VARIABLE WATERLINE FOR HORIZONTAL PRESSURE DECK

(71) Applicant: The Boeing Company, Chicago, IL (US)

(72) Inventors: Mark Ronald McLaughlin, Snohomish, WA (US); Branko Lakic, Kirkland, WA (US); Richard R. Rosman, Seattle, WA (US); Bernhard Dopker, Bellevue, WA (US); Steven David Ingham, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 17/305,640

(22) Filed: Jul. 12, 2021

(65) Prior Publication Data
US 2022/0033051 A1 Feb. 3, 2022

Related U.S. Application Data

(60) Provisional application No. 63/057,945, filed on Jul. 29, 2020.

(51) Int. Cl.
| | |
|---|---|
| *B64C 1/10* | (2006.01) |
| *B64C 1/18* | (2006.01) |
| *B64C 25/04* | (2006.01) |
| *B64C 1/26* | (2006.01) |

(52) U.S. Cl.
CPC ............... *B64C 1/10* (2013.01); *B64C 1/18* (2013.01); *B64C 1/26* (2013.01); *B64C 25/04* (2013.01)

(58) Field of Classification Search
CPC ..................................... B64C 1/18; B64C 1/10
See application file for complete search history.

(56) References Cited

U.S. PATENT DOCUMENTS

| | | | |
|---|---|---|---|
| 8,740,151 B1* | 6/2014 | Rosman | B64C 1/065 244/119 |
| 2009/0283637 A1* | 11/2009 | Nolla | B64C 1/18 244/119 |

* cited by examiner

*Primary Examiner* — Timothy D Collins
*Assistant Examiner* — Eric Acosta
(74) *Attorney, Agent, or Firm* — Yee & Associates, P.C.

(57) ABSTRACT

A pressure deck system for a fuselage of an aircraft. The pressure deck system comprises a first sloping outboard pressure panel, a first longitudinal stiffener connected to the first sloping outboard pressure panel, a second sloping outboard pressure panel opposite the first sloping outboard pressure panel, a second longitudinal stiffener connected to the second sloping outboard pressure panel, pressure panels between the first sloping outboard pressure panel and the second sloping outboard pressure panel and forming the an upper barrier of a wheel well, longitudinal beams connected to the pressure panels and supporting a cabin floor of the fuselage, and a sloping pressure deck connecting a number of these components to the rear spar of the center wing box. A waterline of the pressure deck system is de-coupled from a side-of-body waterline in the fuselage.

20 Claims, 17 Drawing Sheets

VARIABLE WATERLINE FOR HORIZONTAL PRESSURE DECK

BACKGROUND INFORMATION

1. Field

The present disclosure relates generally to a pressure deck system for aircraft applications. More specifically, the present disclosure relates to a variable waterline horizontal pressure deck system situated above the wheel well in an aircraft.

2. Background

Aircraft are designed to operate in low ambient atmospheric pressure while maintaining a pressurized environment for passengers and cargo. To maintain different pressurized regions of the aircraft, pressure panels may be used to separate pressurized and unpressurized compartments. For example, without limitation, a pressure differential exists between the pressurized passenger cabin and the unpressurized wheel well. A horizontal pressure deck serves as a barrier between these two compartments. The horizontal pressure deck creates the upper barrier of the wheel well below the cabin floor, attaching to the rear spar of the wing box, the aft wheel well bulkhead and the side-of-body of the aircraft.

The structural components in this region of the aircraft experience a complex combination of flight and ground loads. Reinforcement of this region is critical to maintain the structural integrity of the aircraft during operation. Such reinforcement may include adding stiffeners and the associated connective components. Reinforcement configurations often increase the weight and complexity of the area more than desired.

Traditional horizontal pressure deck configurations, where the horizontal pressure deck and side-of-body longeron are usually located at different water lines, also create ergonomic challenges for human technicians. These ergonomic challenges result in confined spaces where human technicians have limited visibility and access during assembly. As the complexity of the assembly increases, manufacturing time and risk of assembly error also increases.

Therefore, it would be desirable to have a method and apparatus that takes into account at least some of the issues discussed above, as well as other possible issues.

SUMMARY

An embodiment of the present disclosure provides a pressure deck system for a fuselage of an aircraft. The pressure deck system comprises a first sloping outboard pressure panel, a first longitudinal stiffener connected to the first sloping outboard pressure panel, a second sloping outboard pressure panel opposite the first sloping outboard pressure panel, a second longitudinal stiffener connected to the second sloping outboard pressure panel, pressure panels forming a web between the two sloping outboard pressure panels and forming an upper boundary of a wheel well, and longitudinal beams connected to the pressure panels and supporting a cabin floor of the fuselage. A waterline of the pressure deck system is de-coupled from a side-of-body waterline in the fuselage.

Another illustrative embodiment of the present disclosure provides a method for controlling a pressure differential between a cabin and a wheel well in an aircraft. A first sloping outboard pressure panel is connected to a first longitudinal stiffener. A second sloping outboard pressure panel is connected to a second longitudinal stiffener. An upper boundary of the wheel well is formed by connecting a web of pressure panels between the two outboard pressure panels. Longitudinal beams connect to the pressure panels and support a cabin floor of the fuselage.

A further illustrative embodiment of the present disclosure provides an aircraft comprising an aft wheel well bulkhead, a rear spar of a center wing box, and a pressure deck system. The aft pressure bulkhead forms the aft boundary of a wheel well for a landing gear system. The rear spar of the center wing box forms a forward boundary of the wheel well. The pressure deck system forms an upper boundary of the wheel well. The pressure deck system comprises a first sloping outboard pressure panel, a first wheel well longeron connected to the first sloping outboard pressure panel, a second sloping outboard pressure panel opposite the first sloping outboard pressure panel, a second wheel well longeron connected to the second sloping outboard pressure panel, a web of pressure panels between the two sloping outboard pressure panels, and longitudinal beams connected to the pressure panels and supporting a cabin floor of the fuselage. A waterline of the pressure deck system is de-coupled from a side-of-body waterline in the fuselage.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
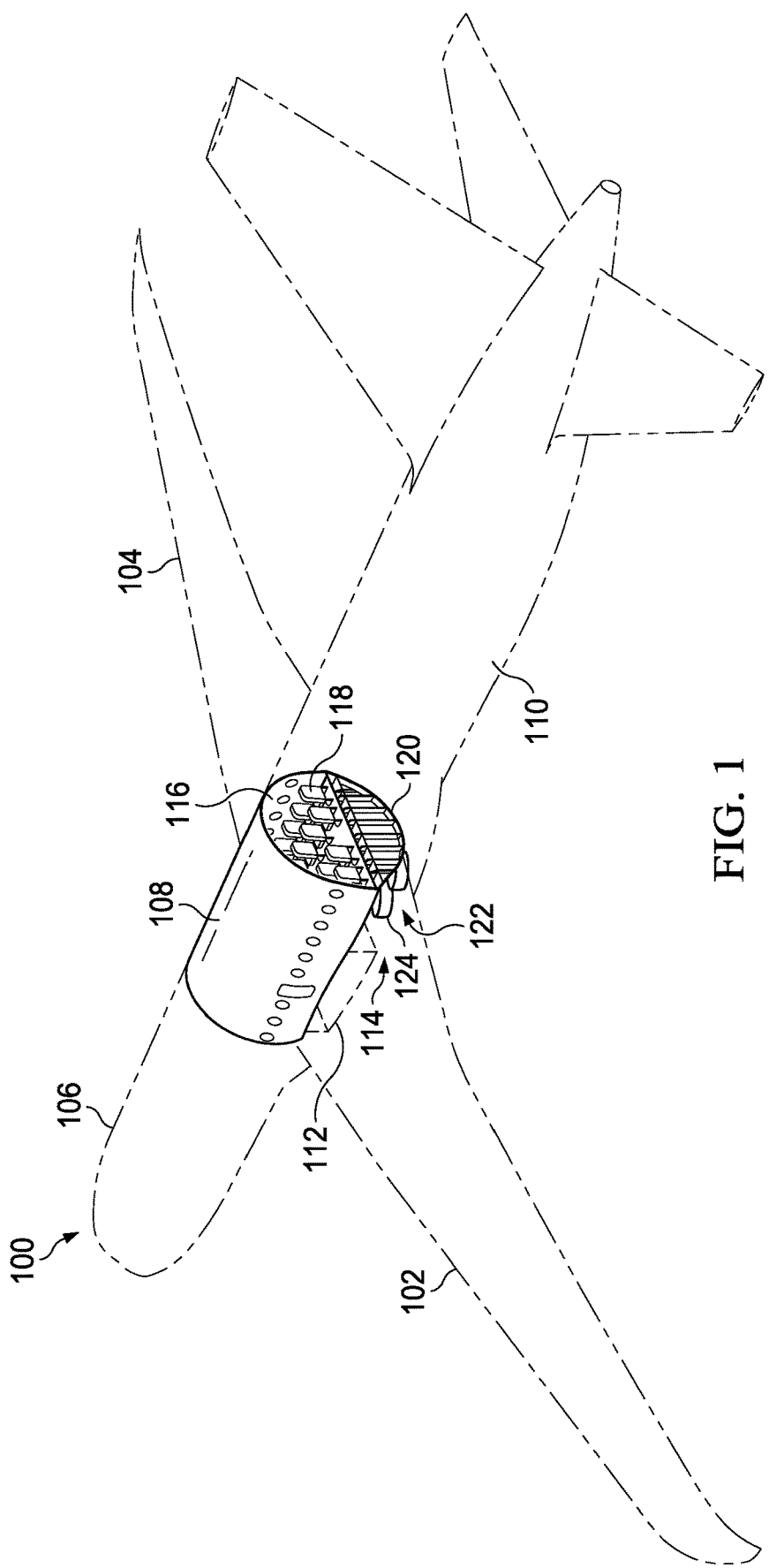
FIG. 1 is an illustration of an isometric view of an aircraft in accordance with an illustrative embodiment.

The illustrative embodiments recognize and take into account one or more different considerations. For example, the illustrative embodiments recognize and take into account that in some currently used horizontal pressure deck systems, the pressure deck waterline is coupled to the side-of-body waterline and the upper panel waterline. In such "single water line" configurations, the horizontal pressure deck is subject to various forces generated by the wing and may compromise between load paths.

The illustrative embodiments also recognize and take into account that in some currently used horizontal pressure deck configurations, complex structural components and stiffeners are added to the architecture of the horizontal pressure deck to account for these forces. Such structural components increase the weight of the aircraft, require heavy splice fittings, and create difficulties in accurately assembling complex interfaces such as the wing box upper surface, longitudinal beam depth requirements, systems integration volume, environmental control system (ECS) penetration in the aft wheel well bulkhead, main landing gear up-lock and hanger link attachments, among others. Structural components may be forced to extend into the wheel well, possibly limiting the maximum clearance for the landing gear system or increasing the cross-sectional area of the fuselage center section which, in turn, increases drag when the aircraft is in operation.

The illustrative embodiments further recognize and take into account that the manufacturing and installation process for a pressure deck system is more complex, more time-consuming, and more expensive than desired. Some currently used applications require assemblies having many parts and complex coupling. Even in configurations where the horizontal pressure deck waterline is separate from the side-of-body waterline, confined workspaces are created by the traditionally used architecture. Such confined spaces create ergonomic and visibility/accessibility challenges for human technicians.

Thus, the disclosed embodiments relate to a variable pressure deck system for a fuselage of an aircraft. The pressure deck system comprises a first sloping outboard pressure panel, a first longitudinal stiffener connected to the first sloping outboard pressure panel, a second sloping outboard pressure panel opposite the first sloping outboard pressure panel, a second longitudinal stiffener connected to the second sloping outboard pressure panel, a web of pressure panels between the two sloping outboard pressure panels that forms the an upper barrier of a wheel well, and longitudinal beams connecting the pressure panels to a cabin floor of the fuselage. The waterline of the pressure deck system is de-coupled from the side-of-body waterline in the fuselage. The illustrative embodiments can be used in a wide variety of aircraft applications to provide the desired level of reinforcement for certification and increased space in the wheel well for clearance of landing gear.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106.

Fuselage 106 has section 108 with skin 110. Other sections of fuselage 106 are shown in phantom such that wing box 112, wheel well 114, and passenger cabin 116 with seats 118 may be seen. Aft wheel well bulkhead 120 serves as the aft boundary of wheel well 114 and separates wheel well 114 from other portions of fuselage 106. Wheel well 114 houses main landing gear system 122. Main landing gear system 122 has tire envelopes 124 in this illustrative example. Each of tire envelopes 124 represent a volume slightly bigger than the tires themselves.

Aircraft 100 in an example of an aircraft in which a pressure deck system may be implemented in accordance with an illustrative embodiment. The components shown in aircraft 100 in FIG. 1 are examples of physical implementations for components in aircraft 200 shown in block form in FIG. 2.

Figure 2:
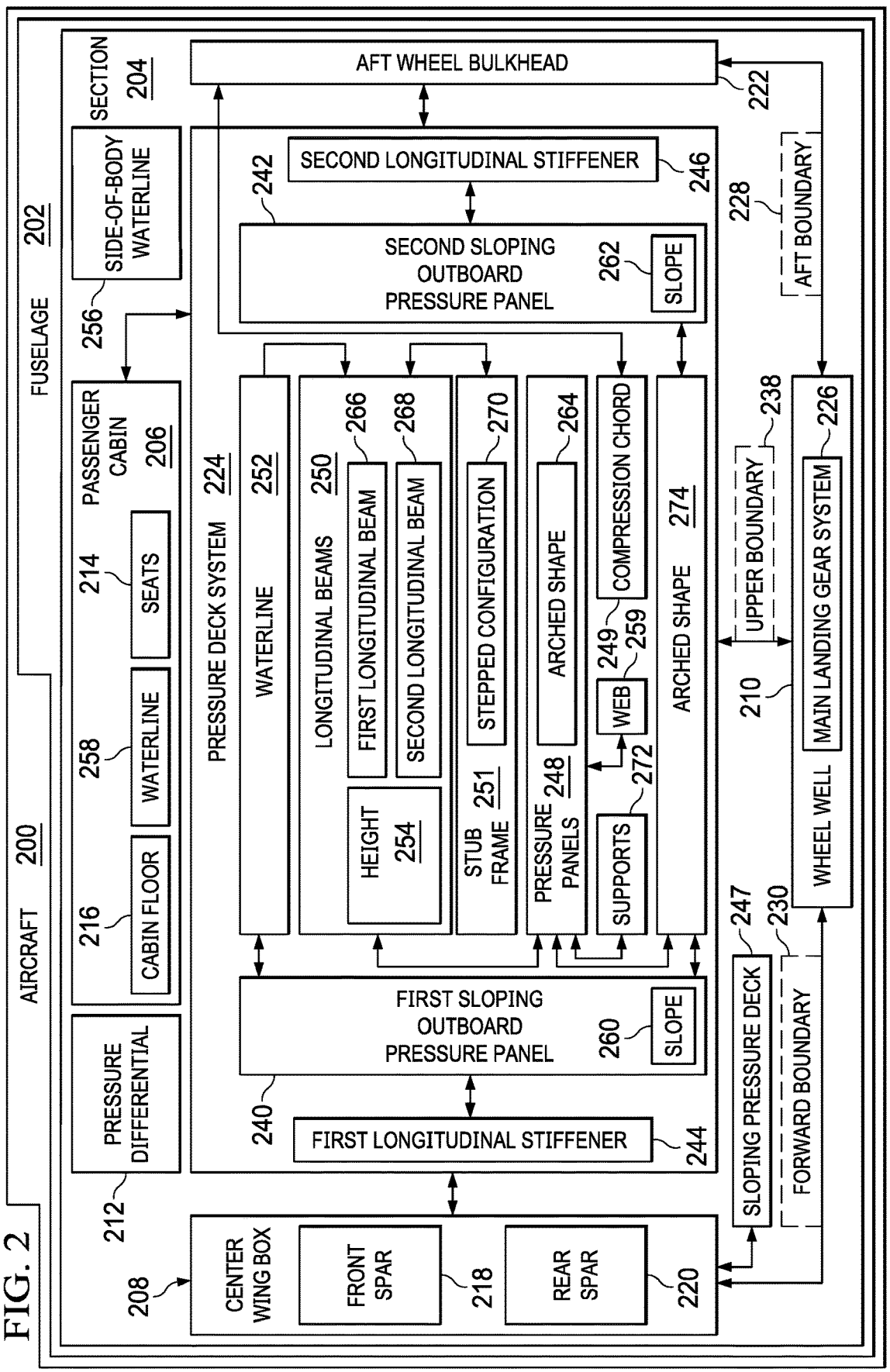
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 200 comprises fuselage 202 with section 204. Section 204 is the mid-body section of aircraft 200.

In this illustrative example, section 204 of fuselage 202 comprises passenger cabin 206, center wing box 208 and wheel well 210. Passenger cabin 206 is pressurized and wheel well 210 is unpressurized. Thus, pressure differential 212 exists between passenger cabin 206 and wheel well 210. Passenger cabin 206 has seats 214 and cabin floor 216 in this illustrative example.

Center wing box 208 provides structural support for, and attaches to, the wings of aircraft 200. Center wing box 208 comprises front spar 218 oriented toward the forward portion of aircraft 200 and rear spar 220 oriented to the aft portion of aircraft 200.

As depicted, wheel well 210 is a compartment in section 204 of fuselage 202. Wheel well 210 houses main landing gear system 226 when main landing gear system 226 is not deployed outside of fuselage 202.

Aft wheel well bulkhead 222 is a structural component in section 204 of fuselage 202 forming aft boundary 228 of wheel well 210 and separating wheel well 210 from other sections of fuselage 202 underneath cabin floor 216. Rear spar 220 of center wing box 208 forms forward boundary 230 of wheel well 210.

As illustrated, pressure deck system 224 forms upper boundary 238 of wheel well 210. Pressure deck system 224 comprises a number of components configured to provide a pressure barrier between the unpressurized wheel well 210 and the pressurized passenger cabin 206. As used herein, "a number of" when used with reference to items means one or more items. Thus, a number of components includes one or more components.

Components within pressure deck system 224 may comprise various types of materials. For example, without limitation, components in pressure deck system 224 may comprise at least one of a metal, a metal alloy, a composite material, or some other suitable type of material. Illustrative embodiments as disclosed herein are intended to highlight the architectural configurations of pressure deck system 224, regardless of material(s) used.

As used herein, the phrase "at least one of," when used with a list of items, means different combinations of one or more of the listed items may be used, and only one of each item in the list may be needed. In other words, "at least one of" means any combination of items and number of items may be used from the list, but not all the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In this illustrative example, pressure deck system 224 comprises first sloping outboard pressure panel 240, second sloping outboard pressure panel 242, first longitudinal stiffener 244, second longitudinal stiffener 246, sloping pressure deck 247, pressure panels 248, compression chord 249, longitudinal beams 250, and stub frame 251. Pressure deck system 224 may be referred to as a "variable waterline horizontal pressure deck" in these illustrative examples since waterline 252 of pressure deck system 224 varies based on height 254 of longitudinal beams 250. Pressure deck system 224 also may be referred to as "variable pressure deck system" or "horizontal pressure deck system" herein as well.

As depicted, first longitudinal stiffener 244 is the outboard structural component of pressure deck system 224 on the left side of the aircraft, facing in the forward direction. First longitudinal stiffener 244 may be commonly referred to as the wheel well longeron in these illustrative examples. First longitudinal stiffener 244 is connected to the side-of-body of fuselage 202 and has side-of-body waterline 256. Cabin floor 216 has waterline 258.

In these illustrative examples, a "waterline" represents the vertical distance of a component, such as pressure deck system 224, from the aircraft reference plane, such as, for example, without limitation, 200 inches below the top surface of cabin floor 216. Waterline 252 of pressure deck system 224 has a different value than side-of-body waterline 256 and/or waterline 258 of cabin floor 216. As a result, waterline 252 of pressure deck system 224 is de-coupled from side-of-body waterline 256 in fuselage 202, as well as waterline 258 of cabin floor 216. The de-coupling of these components allows for more efficient load paths between structures. Side-of-body waterline 256 and waterline 258 of cabin floor 216 do not change in this illustrative example. Only waterline 252 of pressure deck system 224 is variable.

As used herein, when one component is "de-coupled" from another component, the two components may be disassociated with, separate from, or disconnected from one another. In this illustrative example, waterline 252 is disassociated with side-of-body waterline 256 in fuselage 202 and waterline 258 of cabin floor 216. The waterlines are not the same and they are not connected.

As illustrated, first sloping outboard pressure panel 240 is a structural component that connects first longitudinal stiffener 244 to web 259 of pressure deck system 224. Slope 260 of first sloping outboard pressure panel 240 is variable and determined by height 254 of longitudinal beams 250. For instance, the shorter height 254 of longitudinal beams 250, the greater slope 260 of first sloping outboard pressure panel 240 will be. In a similar fashion, the longer height 254 of longitudinal beams 250, the smaller slope 260 of first sloping outboard pressure panel 240 will be. In these illustrative examples, slope 260 has a value greater than zero. In other illustrative examples, slope 260 may have a value of zero or less than zero.

Figure 10:
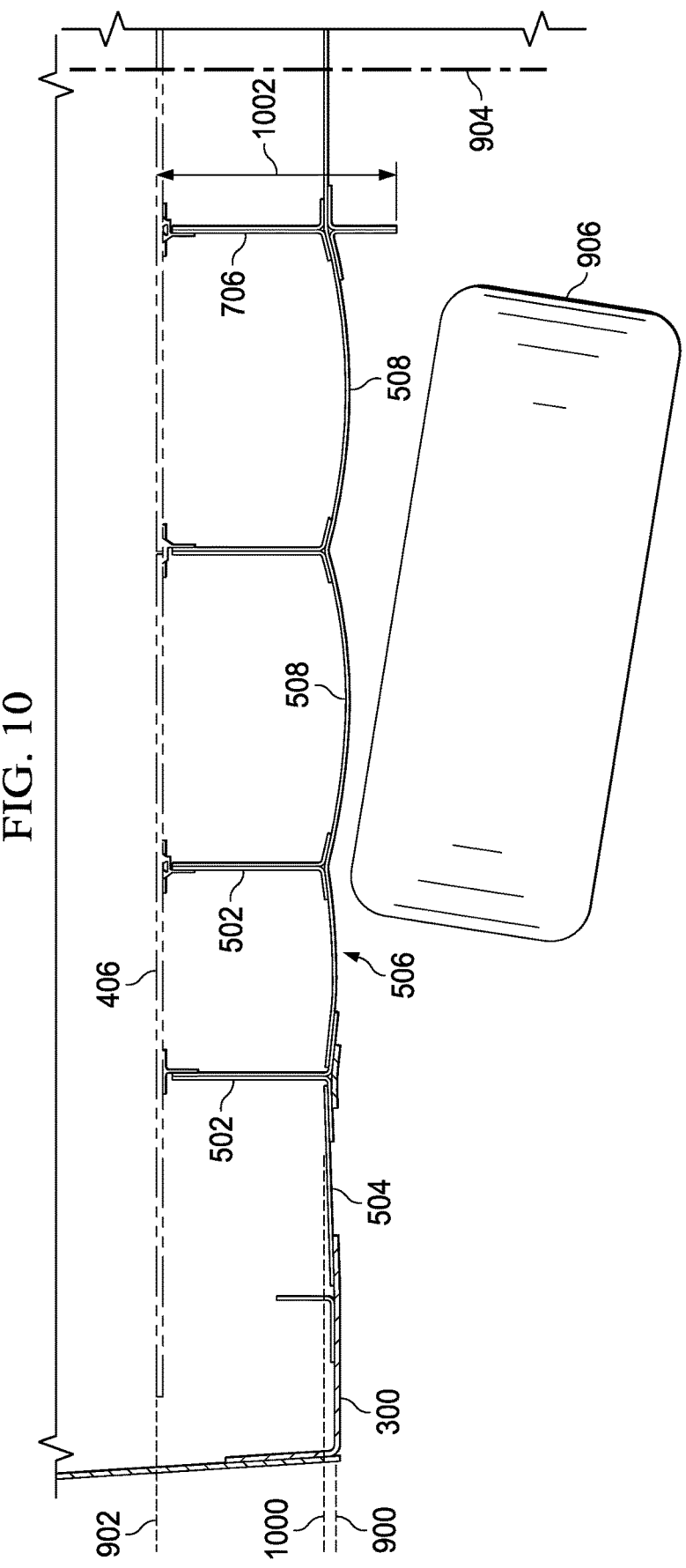
FIG. 10 is an illustration of a cross-sectional view of a variable waterline pressure deck system in accordance with an illustrative embodiment.
Figure 11:
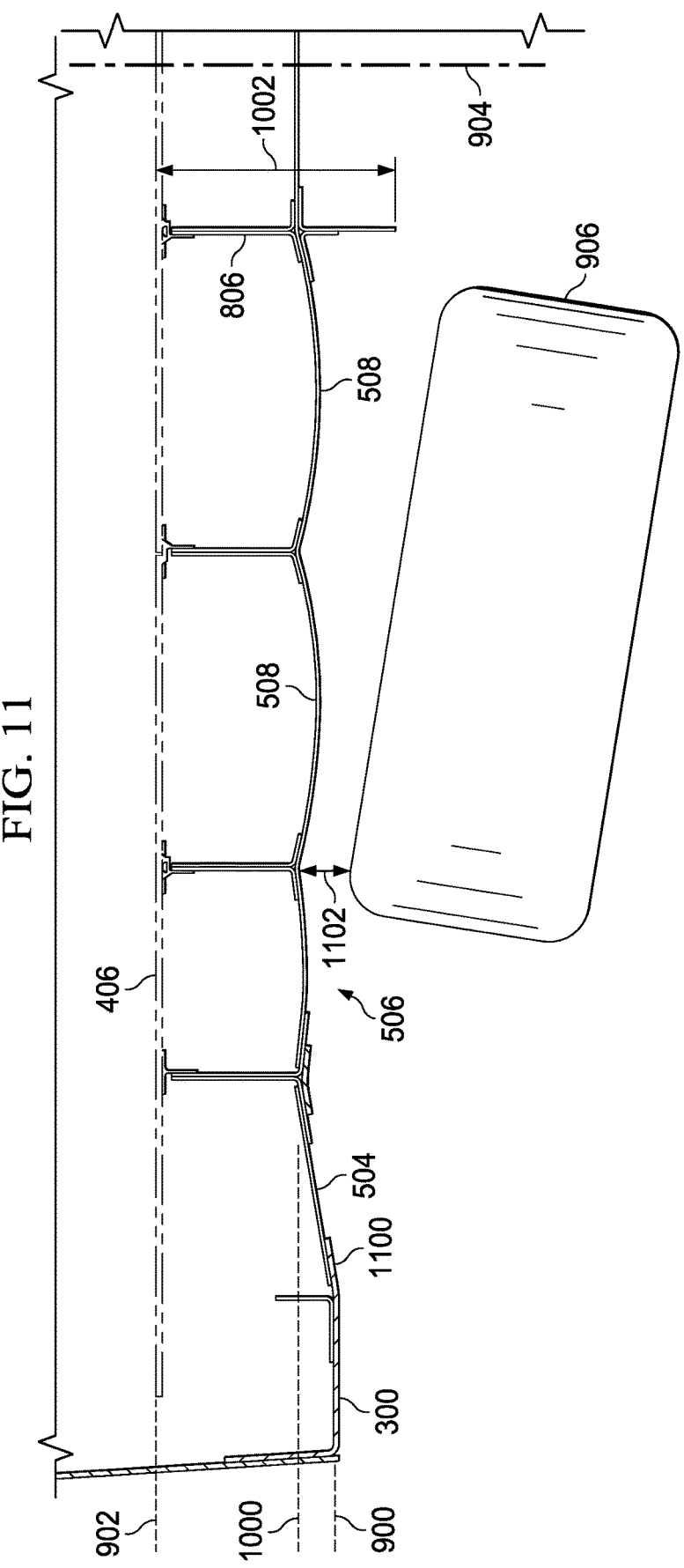
FIG. 11 is another illustration of a cross-sectional view of a variable waterline pressure deck system in accordance with an illustrative embodiment.
Figure 12:
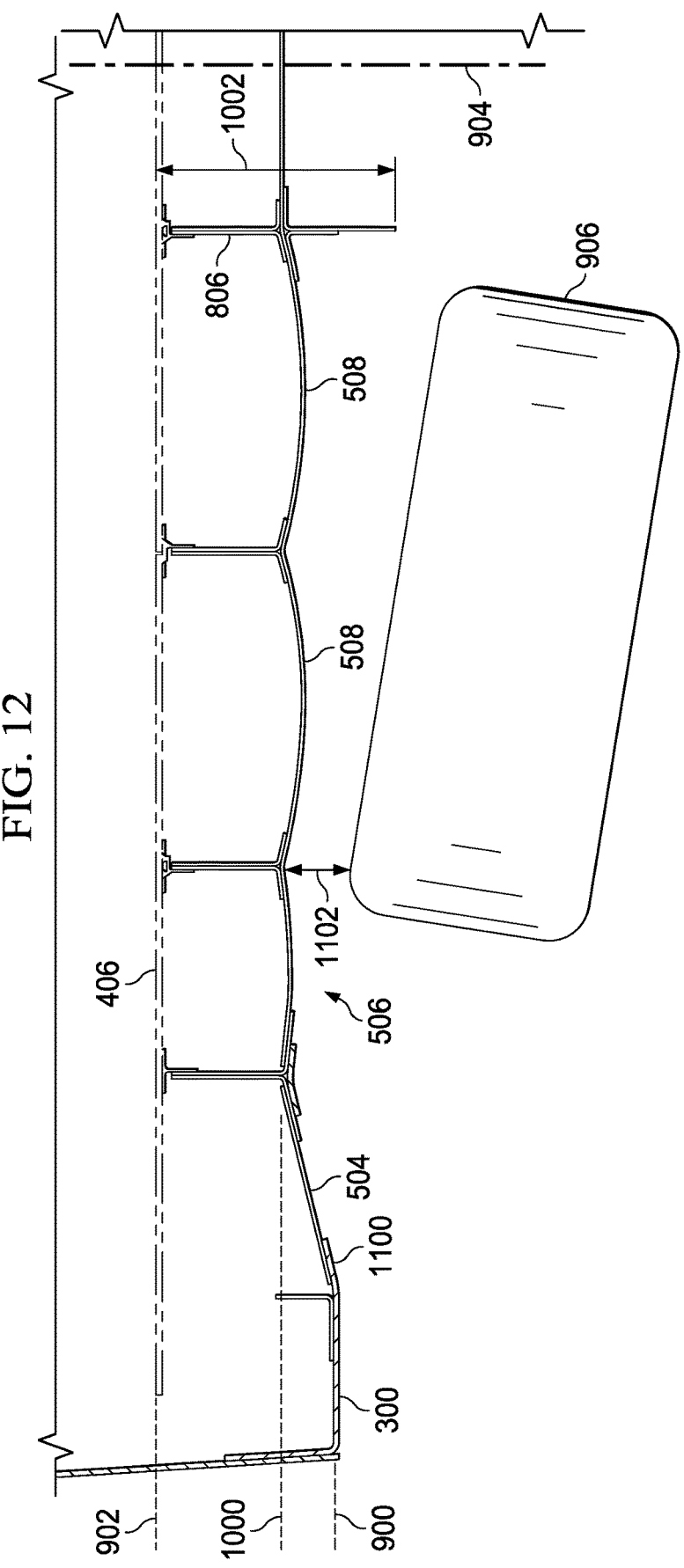
FIG. 12 is yet another illustration of a cross-sectional view of a variable waterline pressure deck system in accordance with an illustrative embodiment.

First longitudinal stiffener 244 is machined to compensate for slope 260 of first sloping outboard pressure panel 240, as shown in FIGS. 10-12 depicted below. This compensation may occur by changing the parameters of first longitudinal stiffener 244 such as, for example, without limitation, adding a flange, changing the slope of a flange, changing the material used to fabricate first longitudinal stiffener 244, using more or fewer fasteners, or in some other manner.

In this illustrative example, second longitudinal stiffener 246 is the outboard structural component of pressure deck system 224 on the right side of aircraft 200, facing in the forward direction. Second longitudinal stiffener 246 is also the wheel well longeron, but on the opposite side of aircraft 200. Second longitudinal stiffener 246 is connected to the side-of-body of fuselage 202 and has side-of-body waterline 256.

Second sloping outboard pressure panel 242 is a structural component that connects second longitudinal stiffener 246 to web 259 of pressure deck system 224. Second sloping outboard pressure panel 242 is opposite first sloping outboard pressure panel 240. Slope 262 of second sloping outboard pressure panel 242 is variable and determined by height 254 of longitudinal beams 250. Slope 262 has a value greater than zero in this illustrative example but may have a value of zero or some other suitable value in other illustrative examples.

As illustrated, slope 262 and slope 260 may have substantially the same value, within selected tolerances. In other illustrative examples, either slope 262 or slope 260 may be different, depending on the particular implementation. In the same manner as first longitudinal stiffener 244, second longitudinal stiffener 246 is machined to compensate for slope 262 of second sloping outboard pressure panel 242. First longitudinal stiffener 244 and second longitudinal stiffener 246 are configured to react to kick loads in these illustrative examples.

Pressure panels 248 are structural components that form web 259 of pressure deck system 224 between first sloping outboard pressure panel 240 and second sloping outboard pressure panel 242. Pressure panels 248 form the bulk of upper boundary 238 of wheel well 210. Each of pressure panels 248 may have arched shape 264 between longitudinal beams 250. Pressure panels 248 may have different shapes in other illustrative examples. In other illustrative examples, pressure panels 248 may each have a flat shape, a variable shape, or some other shape. The "shape" of pressure panels 248 may correspond to the contour of the surface of pressure panels 248.

In some illustrative examples, upper boundary 238 of wheel well 210 may be formed entirely from one pressure panel. In other words, the entirety of web 259 of pressure deck system 224 may be made as a one-piece web 259. In a single panel variation, the shape of different sections of web 259 may be arched. The thickness selected for pressure panels 248 or, an embodiment with only a single panel, may be determined by the structural properties of material used to form such panels.

Longitudinal beams 250 are support structures for pressure panels 248. Longitudinal beams 250 run in the forward-aft direction above pressure panels 248. The primary purpose of longitudinal beams 250 is to react to pressure loading of the pressure boundary. Longitudinal beams 250 also provide additional support to cabin floor 216. Longitudinal beams 250 are connected to pressure panels 248. Height 254 of longitudinal beams 250 is variable in this illustrative example, depending on the selected waterline 252 for pressure deck system 224.

Most of longitudinal beams 250 connect to pressure panels 248 and do not protrude into wheel well 210 beyond, for example, the minimal amount necessary for the flange of one of longitudinal beams to connect securely to one or more of pressure panels 248. Protrusion of longitudinal beams 250 affects clearance of landing gear system 226. However, in some illustrative examples, some of longitudinal beams 250 may protrude into wheel well 210. In this illustrative example, first longitudinal beam 266 and second longitudinal beam 268, the centermost beams in pressure deck system 224, protrude into wheel well 210. Both first longitudinal beam 266 and second longitudinal beam 268 are inboard of main landing gear system 226. First longitudinal beam 266 and second longitudinal beam 268 are configured to provide additional strength to the assembly and maintain bending efficiency.

Additional structures may connect longitudinal beams 250 to one another. These structures may take various forms with different shapes, contours, openings, materials or other suitable characteristics. Structures shown in subsequent figures are not meant to be limiting in an illustrative embodiment.

As depicted, sloping pressure deck 247 comprises structural components connected to rear spar 220 of center wing box 208 of aircraft 200 and first sloping outboard pressure panel 240, second sloping outboard pressure panel 242, and pressure panels 248. Specifically, sloping pressure deck 247 comprises one or more pressure barriers configured to connect the forward end of pressure panels 248, first sloping outboard pressure panel 240 and second sloping outboard pressure panel 242 to rear spar 220. The incline and size of sloping pressure deck 247 is determined by the height of web 259 of pressure deck system 224.

In this illustrative example, compression chord 249 is a structural component of pressure deck system 224 connected to aft wheel well bulkhead 222 internal to wheel well 210. Compression chord 249 is configured to react to compression loads in these illustrative examples.

As illustrated, stub frame 251 comprises structural members running transverse to longitudinal beams 250. Stub frame 251 has stepped configuration 270. The structural members in stub frame 251 connect the frame of fuselage 202 to the outboard beam in longitudinal beams 250 on each side of fuselage 202. Stub frame 251 may be integrated into the frame of fuselage 202.

In this illustrative example, pressure deck system 224 also comprises supports 272. Supports 272 are structural components located internal to wheel well 210. Supports 272 connect rear spar 220 of center wing box 208 of aircraft 200 to at least one of pressure panels 248.

The configuration of pressure deck system 224 gives upper boundary 238 of wheel well 210 arched shape 274 as shown in FIG. 12. Pressure deck system 224 with arched shape 274 also may be referred to as having a radius. Arched shape 274 allows for increased volume in wheel well 210 and maximum clearance of main landing gear system 226 driven by wheels-up landing, which in turn reduces drag by reducing the fairing depth of the cross-section of fuselage 202. Full retraction of main landing gear system 226 occurs with more clearance within wheel well 210 than with currently used pressure deck configurations. The capacity of wheel well 210 changes based on the slope of the outboard pressure panels (240, 242) and height 254 of longitudinal beams 250.

Additionally, pressure deck system 224, in accordance with an illustrative embodiment, optimizes the conflicting alignment of many interfaces in wheel well 210. An illustrative embodiment simplifies pressure deck system 224 and opens up wheel well 210 without compromising load path efficiency. As a result, no confined spaces exist in wheel well 210 and human technicians are not as ergonomically challenged during its assembly. The option of assembly automation may be explored as well.

Thus, the illustrative embodiments provide a flexible architecture for pressure deck system 224 that can optimize the volume of wheel well 210 as required. The inclusion of fewer parts reduces the overall weight of pressure deck system 224, translating to weight savings for aircraft 200 as a whole.

Figure 3:
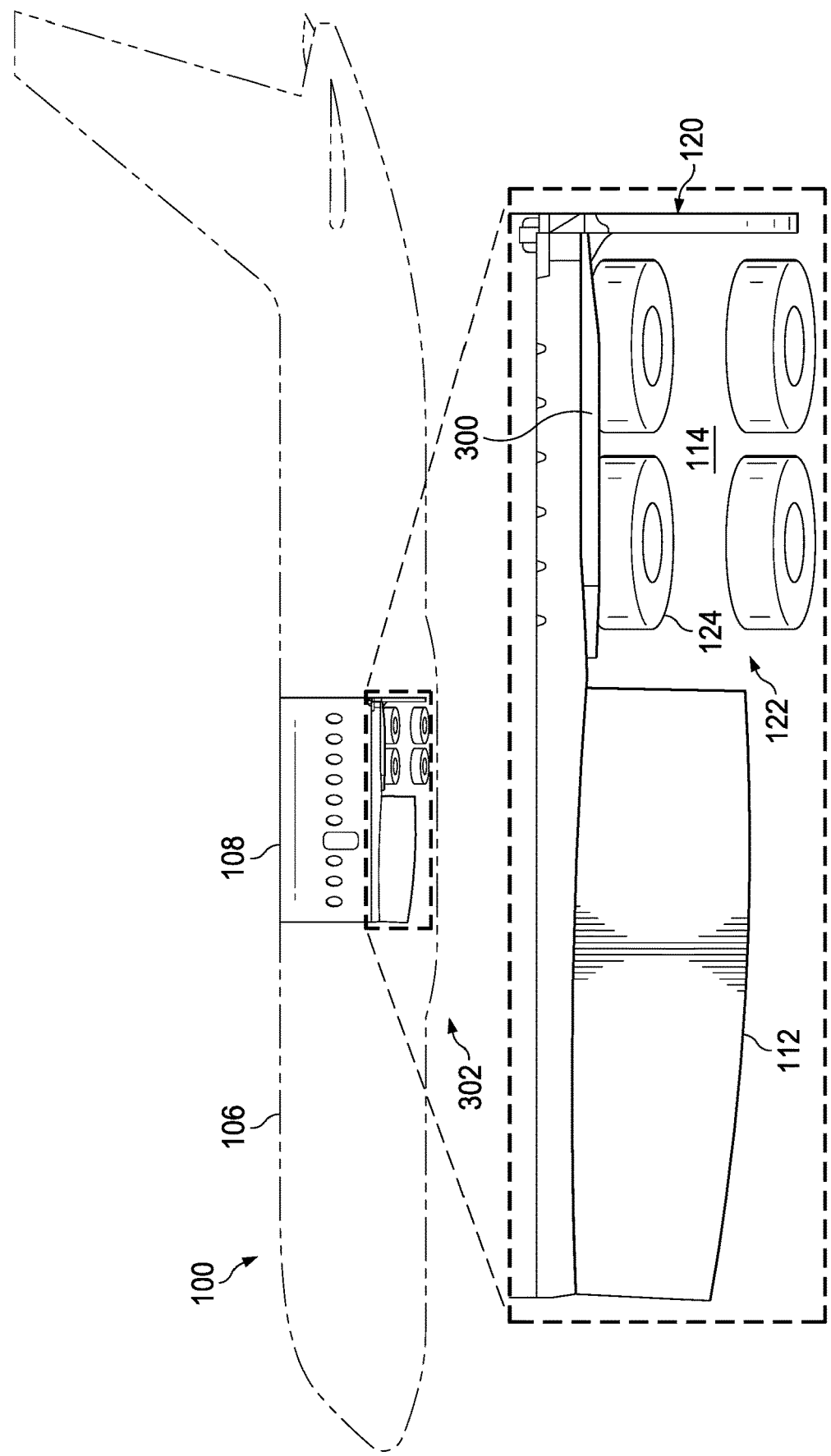
FIG. 3 is an illustration of a side pull-out view of a wheel well in an aircraft in accordance with an illustrative embodiment.

With reference to FIG. 3, an illustration of a side pull-out view of a wheel well in an aircraft is depicted in accordance with an illustrative embodiment. In this illustrative example, wheel well 114, wing box 112 and landing gear system 122 are shown in a pull-out view and in greater detail. Wheel well longeron 300 is shown connected to aft wheel well bulkhead 120. Wheel well 114, wing box 112, aft wheel well bulkhead 120, landing gear system 122 and longeron 300 are examples of physical implementations for wheel well 210, center wing box 208, aft wheel well bulkhead 222, and first longitudinal stiffener 244, respectively, shown in block form in FIG. 2.

As depicted, section 108 of fuselage 106 has portion 302 with a larger cross-section than the remainder of fuselage 106. The size of portion 302 of section 108 of fuselage 106 affects the drag of aircraft 100. Reduction in the cross-section of portion 302 may provide benefits to the performance of aircraft 100. One way to reduce such cross-section is to provide for maximum clearance of fully retracted landing gear system 122 in wheel well 114 using a variable waterline pressure deck system in accordance with an illustrative embodiment.

Figure 4:
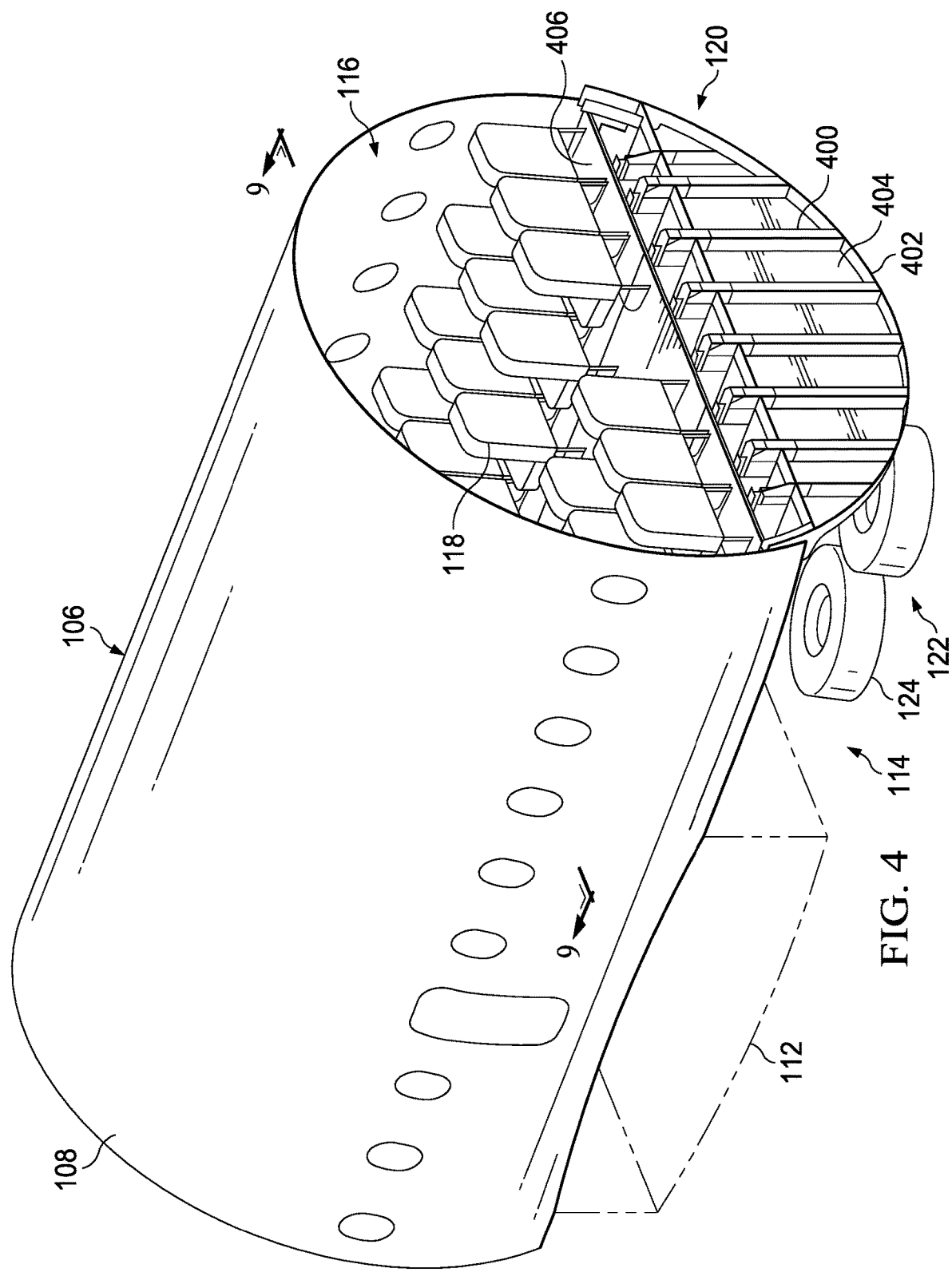
FIG. 4 is an illustration of an isometric view of a section of a fuselage of an aircraft in accordance with an illustrative embodiment.

Turning next to FIG. 4, an illustration of an isometric view of a section of a fuselage of an aircraft is depicted in accordance with an illustrative embodiment. Section 108 of fuselage 106 is shown in greater detail in this view. Other features of aircraft 100 have been removed.

As depicted, aft wheel well bulkhead 120 has vertical beams 400, lower chord 402 and web 404. Each of vertical beams 400 in aft wheel well bulkhead 120 connect to longitudinal beams 502 in pressure deck system 500 shown in FIG. 5.

In this illustrative example, floor panels 406 are part of the cabin floor in passenger cabin 116. Longitudinal beams 502 shown in detail in FIG. 5 support floor panels 406.

Figure 5:
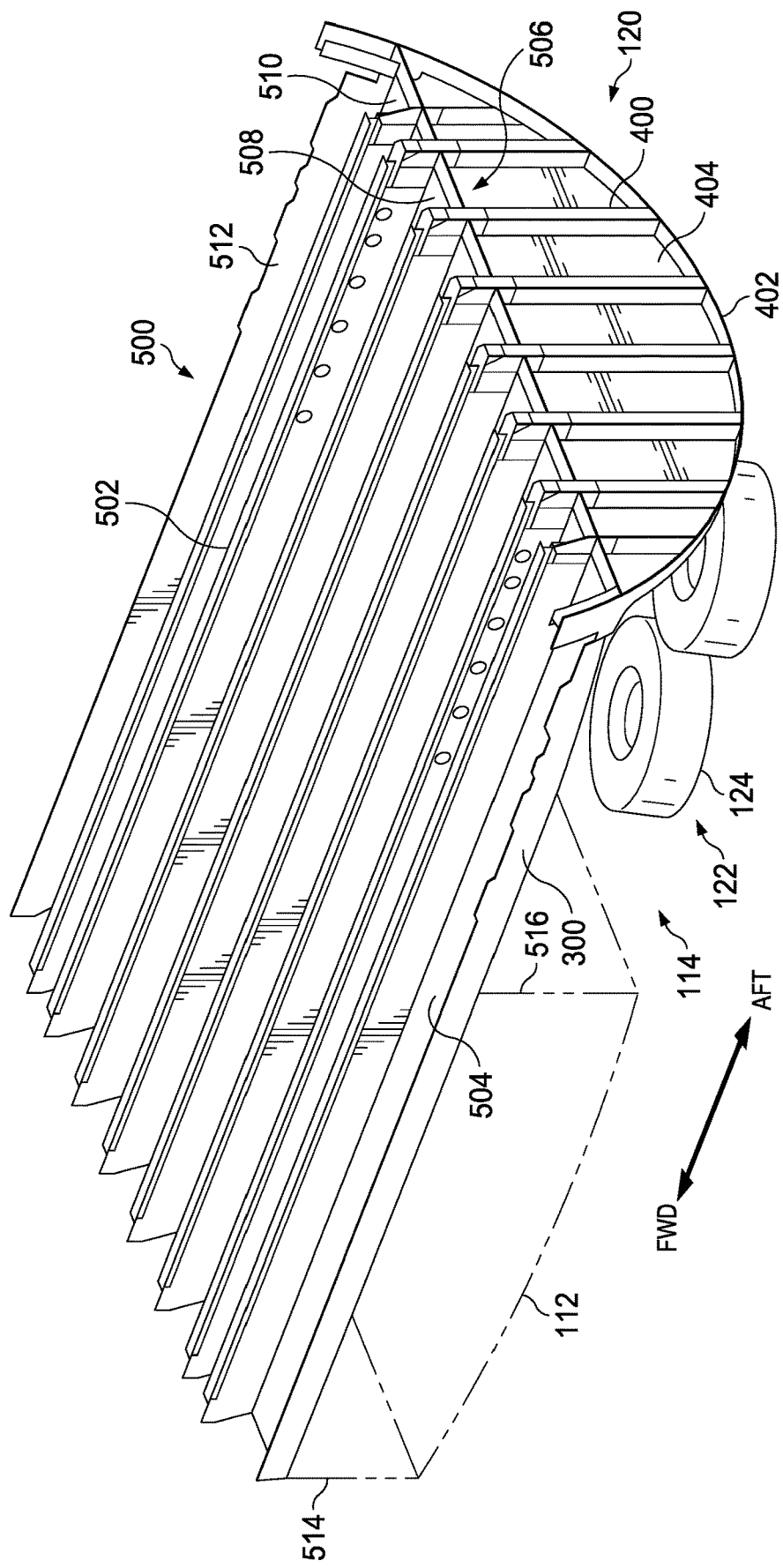
FIG. 5 is an illustration of an isometric view of a pressure deck system for an aircraft in accordance with an illustrative embodiment.

In FIG. 5, an illustration of an isometric view of a pressure deck system for an aircraft is depicted in accordance with an illustrative embodiment. Skin 110 of section 108 of fuselage 106 has been removed in this view. Floor panels 406 of passenger cabin 116 and seats 118 also have been removed such that pressure deck system 500 may be seen in greater detail.

Pressure deck system 500 comprises longitudinal beams 502, wheel well longeron 300, sloping outboard pressure panel 504, pressure deck web 506 having pressure panels 508, sloping pressure panel 510 and wheel well longeron 512. Pressure deck system 500 with longitudinal beams 502, sloping outboard pressure panel 504, pressure panels 508, sloping pressure panel 510 and wheel well longeron 512 are examples of physical implementations for pressure deck system 224 having longitudinal beams 250, first outboard sloping pressure panel 240, pressure panels 248, second sloping pressure panel 242 and second longitudinal stiffener 246, respectively, shown in block form in FIG. 2.

As depicted, wing box 112 has front spar 514 and rear spar 516. Front spar 514 and rear spar 516 are physical implementations for front spar 218 and rear spar 220 shown in block form in FIG. 2. Rear spar 516 forms the forward boundary of wheel well 114 while aft wheel well bulkhead 120 forms the aft boundary of wheel well 114.

Figure 6:
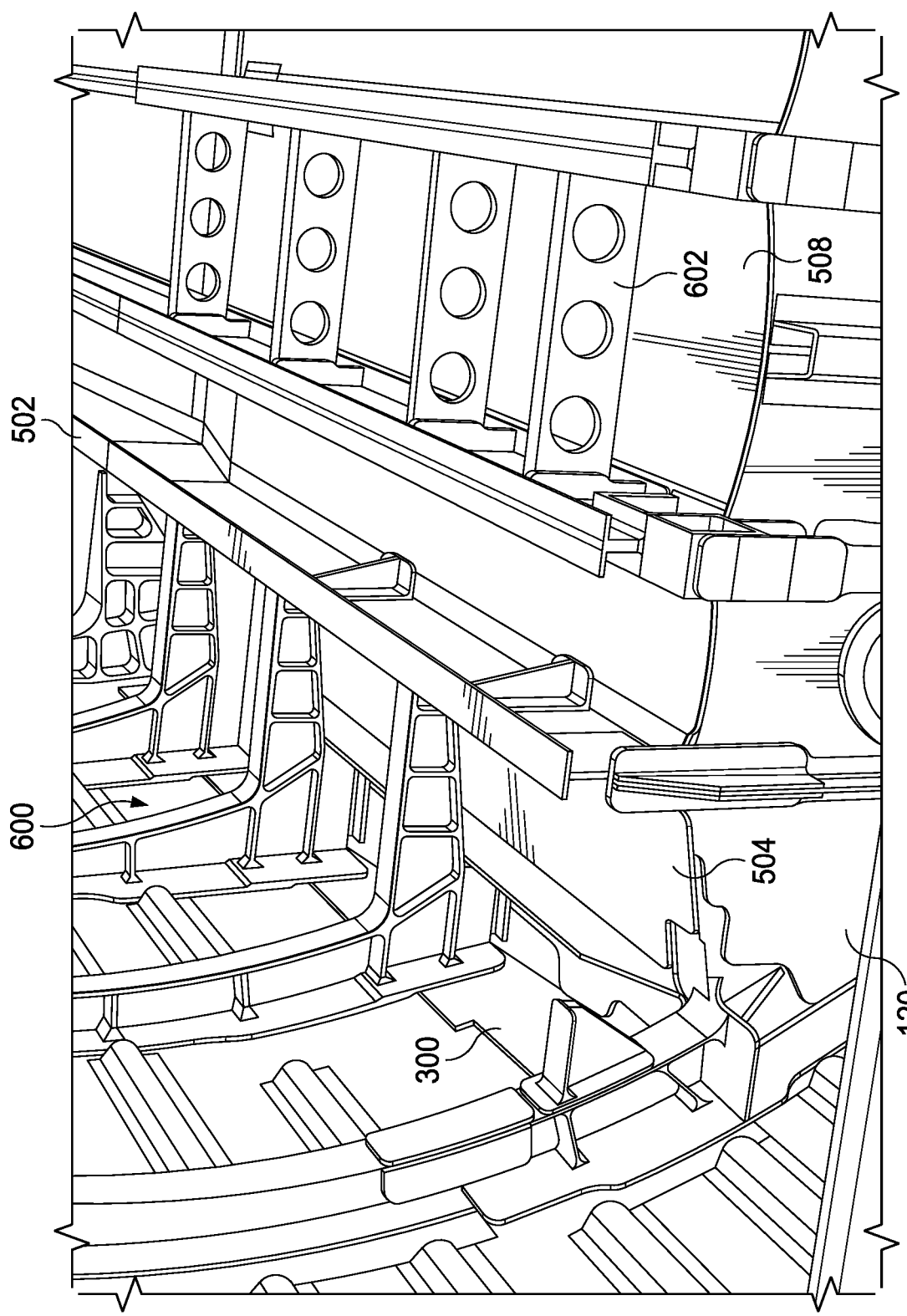
FIG. 6 is an illustration of an isometric view of a pressure deck system for an aircraft in accordance with an illustrative embodiment.

In FIG. 6, an illustration of an isometric view of a pressure deck system for an aircraft is depicted in accordance with an illustrative embodiment. In this depicted example, stub frame 600 has been added to the architecture. Stub frame 600 is an example of a physical implementation of stub frame 251 shown in block form in FIG. 2. Each beam in stub frame 600 attaches to the outboard-most one of longitudinal beams 502. In this architecture, unlike with traditional horizontal pressure deck configurations, transverse beams do not run the width of fuselage 106 over wheel well 114 between pressure panels 508 and cabin floor 116. Instead, a number of transverse supports 602 may be strategically placed between any two of longitudinal beams 502 to provide the desired level of support. Thus, without transverse beams running the width of fuselage 106 over wheel well 214, longitudinal beams 502 provide primary support structure for cabin floor 116 and are sufficient to do so.

Figure 7:
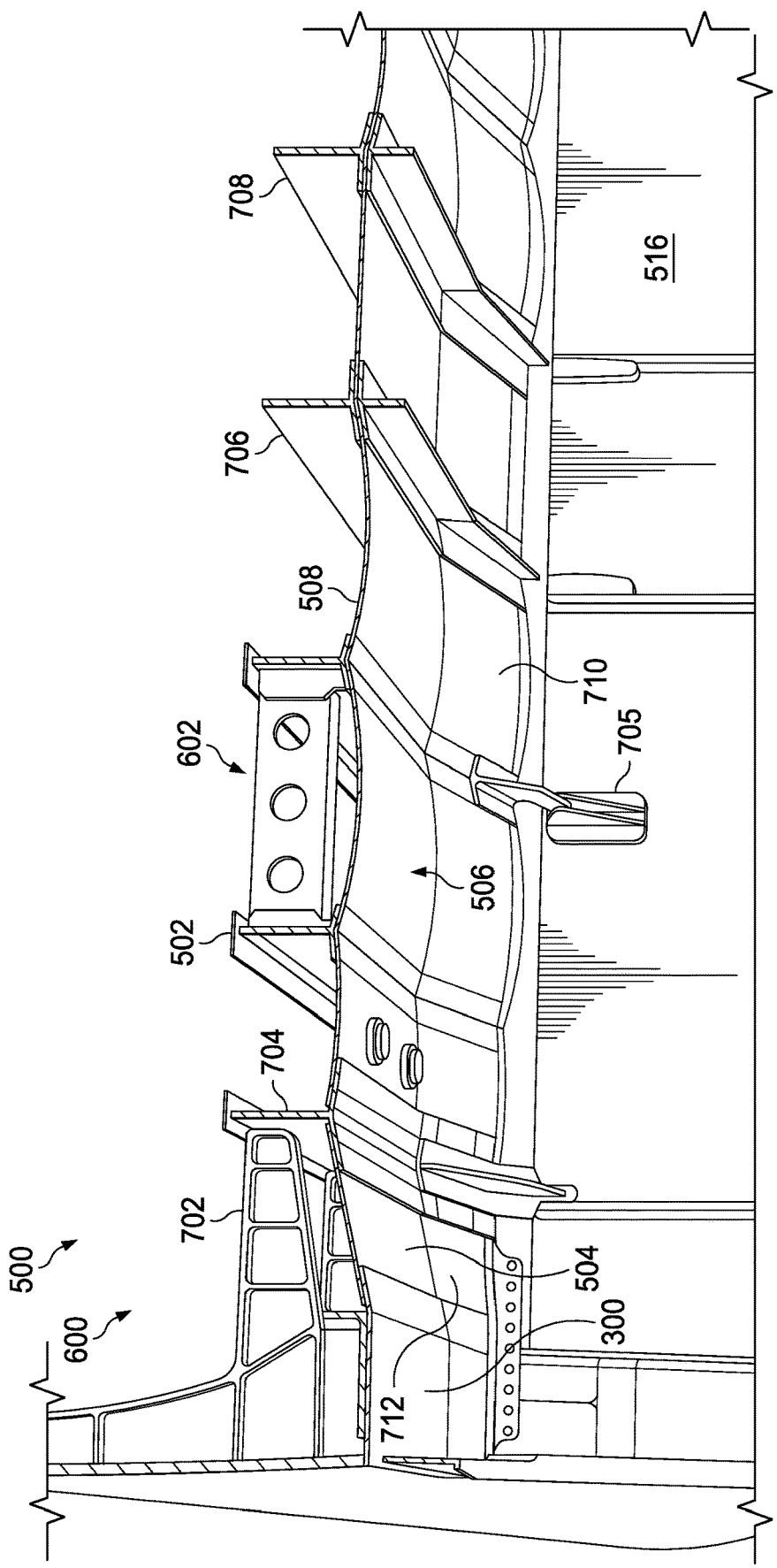
FIG. 7 is an illustration of an upward facing view of a pressure deck system in accordance with an illustrative embodiment.

Turning next to FIG. 7, an illustration of an upward facing view of a pressure deck system is depicted in accordance with an illustrative embodiment. Components in pressure deck system 500 are shown looking in the forward direction of aircraft 100. Web 506 with pressure panels 508 form the upper boundary of wheel well 114.

Stub frame 600 has a stepped configuration, allowing for changes in the slope of sloping outboard pressure panel 504 if manufacturers wanted to increase or decrease the waterline of pressure deck system 224. Beam 702 in stub frame 600 attaches directly to longitudinal beam 704. In a similar fashion, a beam in stub frame 600 will attach directly to a longitudinal beam on the other side of the fuselage, allowing for varying slopes for sloping pressure panel 510 as desired. Stub frame attachment to longitudinal beam 704 stabilizes longitudinal beam 704 from rolling to the side under compression. The taller the beam, the more important beam stabilization in this manner will be.

Supports 705 are also seen in this view. Supports 705 attach longitudinal beams 502 to rear spar 516 in this illustrative example. Supports 705 are examples of physical implementations for supports 272 shown in block form in FIG. 2.

As depicted, longitudinal beam 706 and longitudinal beam 708 have a greater height than the rest of longitudinal beams 502 and extend into wheel well 114. Longitudinal beam 706 and longitudinal beam 708 are the innermost beams and do not interfere with the clearance of tire envelopes 124. Longitudinal beam 706 and longitudinal beam 708 maintain bending stiffness efficiency for pressure deck system 500.

Sloping pressure deck 710 is also seen in this view. Sloping pressure deck 710 is an example of a physical implementation for sloping pressure deck 247 shown in block form in FIG. 2. Panel 712 is part of sloping pressure deck 710. Panel 712 connects wheel well longeron 300, rear spar 516, sloping outboard pressure panel 504, and the outboard one of longitudinal beams 502. Due to the complex connection of these components, panel 712 may be referred to as a "twisted panel."

Figure 8:
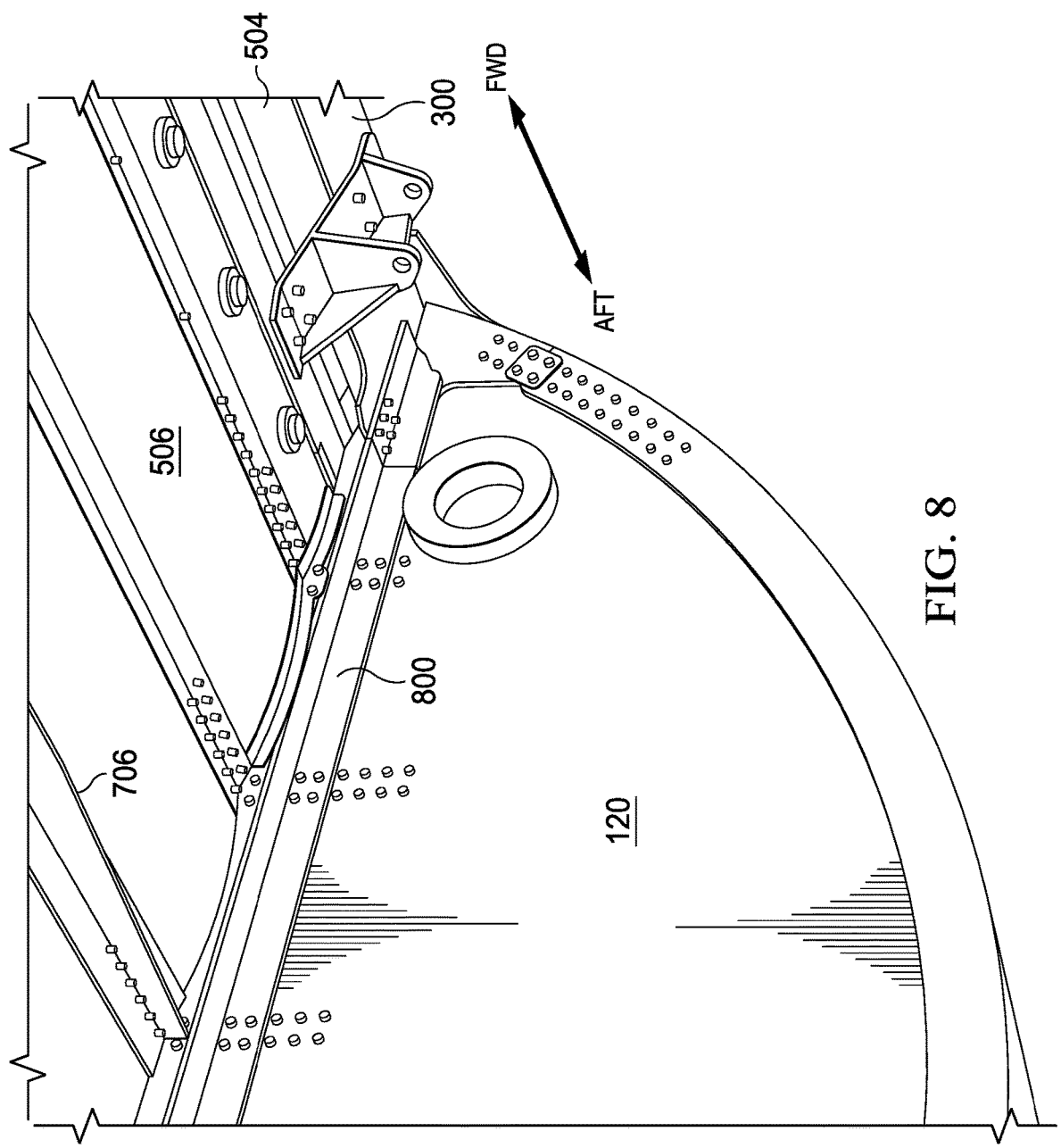
FIG. 8 is an illustration of an upward facing view of an aft wheel well bulkhead with a compression chord in accordance with an illustrative embodiment.

Next, in FIG. 8, an illustration of an upward facing view of an aft wheel well bulkhead with a compression chord is depicted in accordance with an illustrative embodiment. Components in pressure deck system 500 are shown looking in the aft direction in this view.

In this illustrative example, compression chord 800 has been connected to aft wheel well bulkhead 120 internal to wheel well 114. Compression chord 800 is an example of a physical implementation for compression chord 249 shown in block form in FIG. 2. Compression chord 800 is an internal offset forward facing compression chord in this illustrative example. Compression chord 800 may also be oriented aft of aft wheel well bulkhead 120 in other illustrative examples. In still other illustrative examples, compression chord 800 may be omitted entirely.

Figure 9:
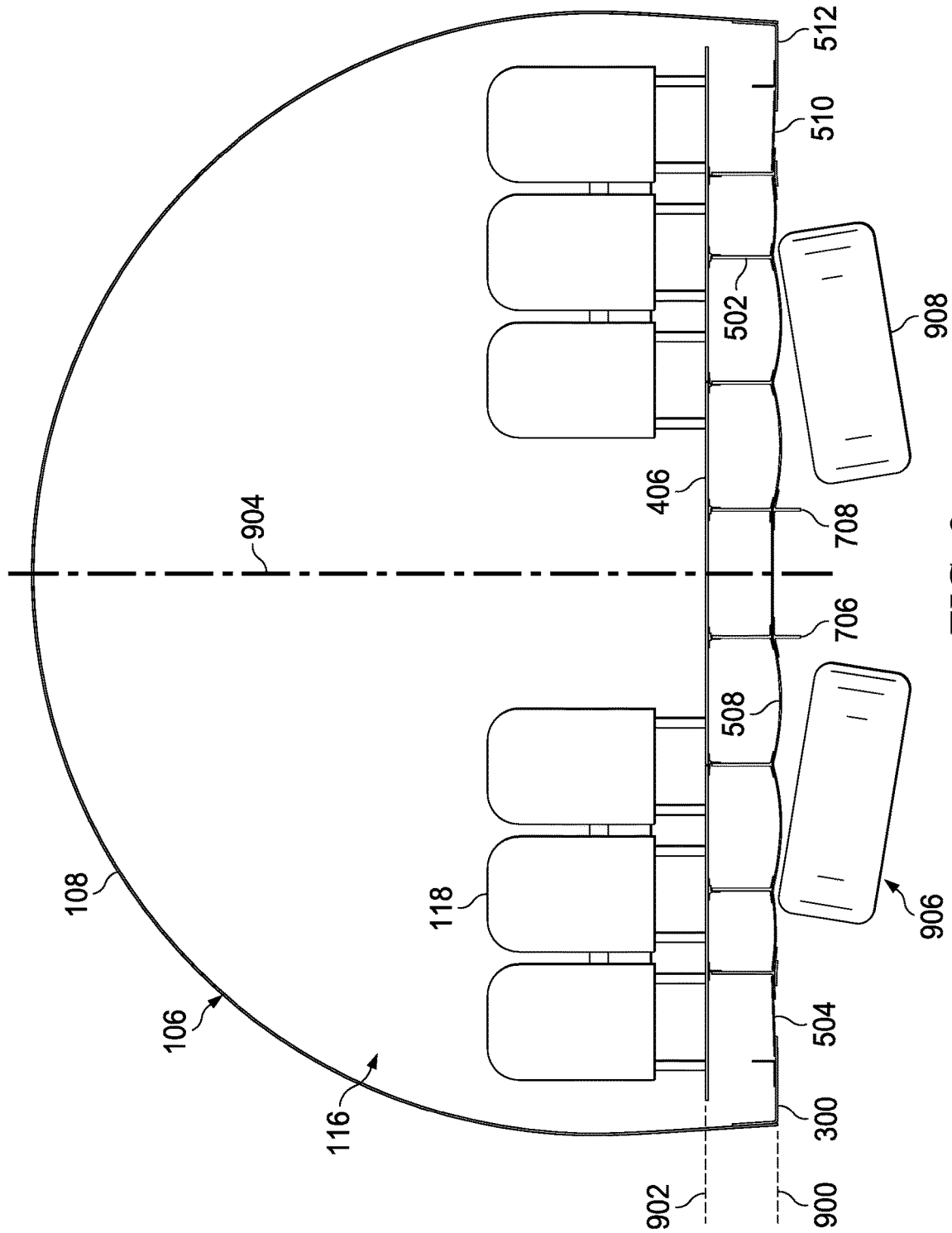
FIG. 9 is an illustration of a cross-sectional view of a fuselage with a variable waterline pressure deck system in accordance with an illustrative embodiment.

With reference next to FIG. 9, an illustration of a cross-sectional view of a fuselage with a variable pressure deck system is depicted in accordance with an illustrative embodiment. In this illustration, a cross-sectional view of pressure deck system 500 is shown along the lines 9-9 in FIG. 4, looking in the forward direction.

As depicted, waterline 900 is the waterline for wheel well longeron 300 and wheel well longeron 512. Waterline 900 represents the side-of-body waterline in this illustrative example. Waterline 902 is the waterline for floor panels 406 in passenger cabin 116. Waterline 900 and waterline 902 are physical implementations of side-of-body waterline 256 and waterline 258 of cabin floor 216 shown in block form in FIG. 2. Waterline 1000 of pressure deck system 500 shown in FIG. 10 is de-coupled from both waterline 900 and waterline 902 in this figure.

Centerline 904 separates fuselage 106 into hemispheres. The left hemisphere is depicted in greater detail in FIGS. 10-14.

Main landing gear tire envelopes 124 from FIG. 1 include tire envelope 906 and tire envelope 908, shown in this view, one on each side of centerline 904 of fuselage 106. The outline of tire envelope 906 represents multiple possible positions of the tire in the retracted state which may occur because of inertia acceleration/deceleration and tire vibration and rotation. The clearance of tire envelopes (906, 908) changes as the height of horizontal pressure deck system 500 changes, shown in FIGS. 10-12.

Sloping pressure panel 504 has a planar surface in this illustrative example. Pressure panels 508 primarily have an arched surface to each panel. However, toward centerline 904, the pressure panel between longitudinal beam 706 and longitudinal beam 708 is substantially planar.

FIGS. 10-13 show illustrations of cross-sectional views of a variable waterline pressure deck system with different beam heights. Turning to FIG. 10, longitudinal beams 502 have a height of approximately 11 inches. Waterline 1000 of pressure deck system 500 is slightly above side-of-body waterline 900. Distance 1002 represents the distance between floor panels 406 in passenger cabin 116, which corresponds to the height of longitudinal beam 706. As seen in this view, each of pressure panels 508 has an arched shape.

In FIG. 11, longitudinal beams 502 have a height of approximately 10 inches. Waterline 1000 of pressure deck system 500 changes, while distance 1002 stays the same. The slope of sloping outboard pressure panel 504 increases. Flange 1100 of wheel well longeron 300 is designed to compensate for that changing slope. Clearance 1102 between tire envelope 906 and web 506 of pressure deck system 500 increases.

FIG. 12 shows longitudinal beams 502 at 9 inches in height. Waterline 1000 of pressure deck system 500 changes again, while distance 1002 stays the same. The slope of sloping outboard pressure panel 504 increases. Flange 1100 of wheel well longeron 300 is designed to compensate for that changing slope. Clearance 1102 between tire envelopes 124 and web 506 of pressure deck system 500 increases again. With sloping outboard pressure panel 504 and web 506 in this configuration, the entirety of pressure deck system 500 has an arched shape.

Figure 13:
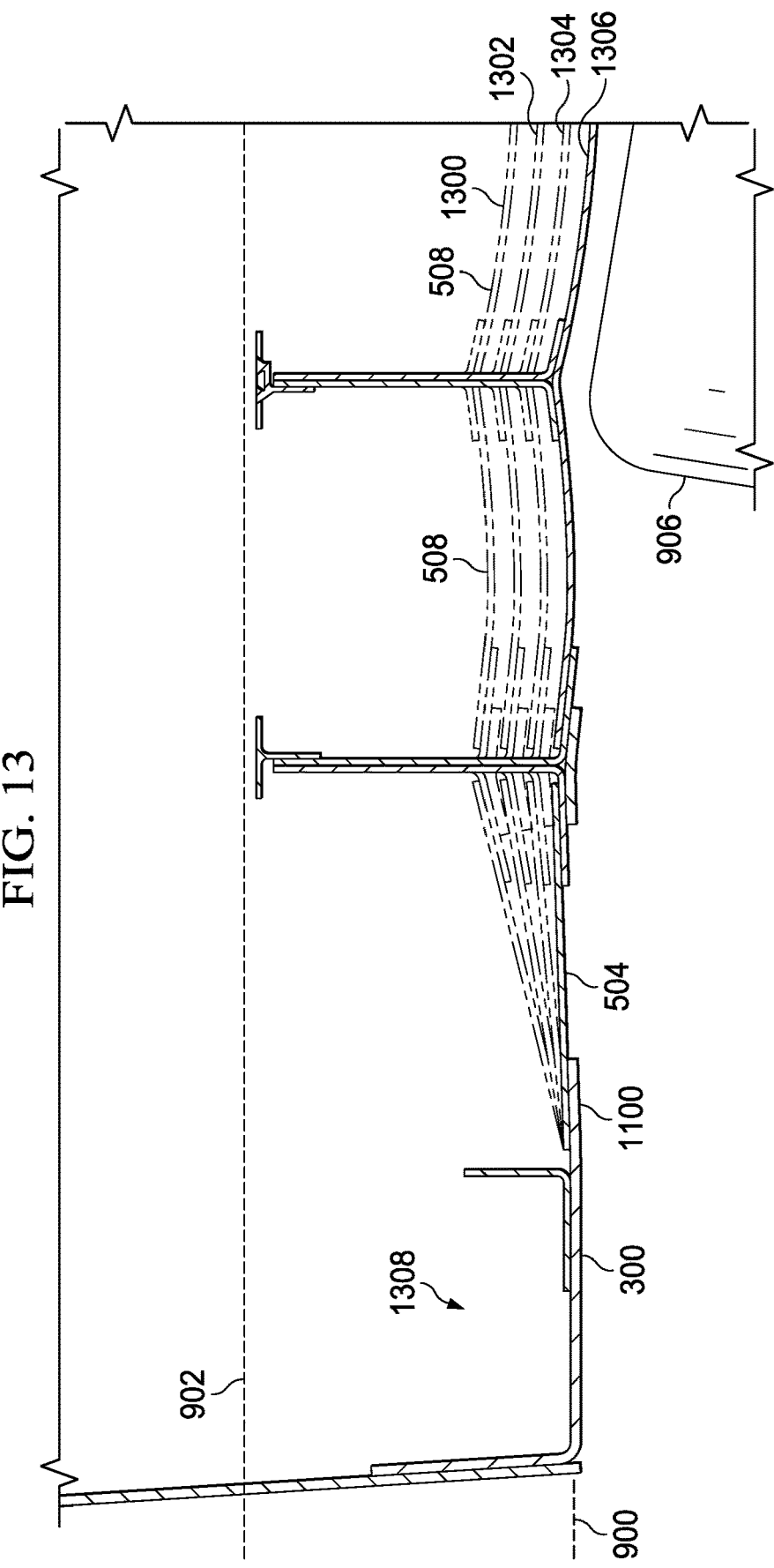
FIG. 13 is an illustration of a cross-sectional view of a comparison between different variable waterline pressure deck system configurations in accordance with an illustrative embodiment.

FIG. 13 highlights the differences of each iteration of variable pressure deck system 500, showing sloping outboard pressure panel 504 and corresponding web 506 with pressure panels 508 in phantom. Pressure deck 1300 has 9-inch beams, pressure deck 1302 has 10-inch beams, pressure deck 1304 has 10-inch beams, and pressure deck 1306 has 11-inch beams.

The recitation of different heights for pressure decks in these illustrative examples are meant only as examples. Beams may be 4 inches, 13 inches, 17 inches, 7.5 inches, or any value desired by an aircraft manufacturer. Sets of beams or individual beams in a pressure deck system may have different heights or the same heights, depending on the implementation.

The architecture disclosed herein highlights the accessibility and ergonomic advantages of a horizontal pressure deck system that has a waterline de-coupled from the side-of-body waterline. As seen in this view, area 1308 is free from confined spaces. Human operators are free to move about to assemble the components in the aircraft. In a similar fashion, the wheel well remains free of confined workspaces as well, making the illustrative embodiments superior to the currently used systems. The key enabler of lifting the horizontal pressure deck waterline is being able to pull the main landing gear up higher into the wheel well, thus enabling a reduction of the wing to body fairing and a substantial reduction in drag.

Figure 14:
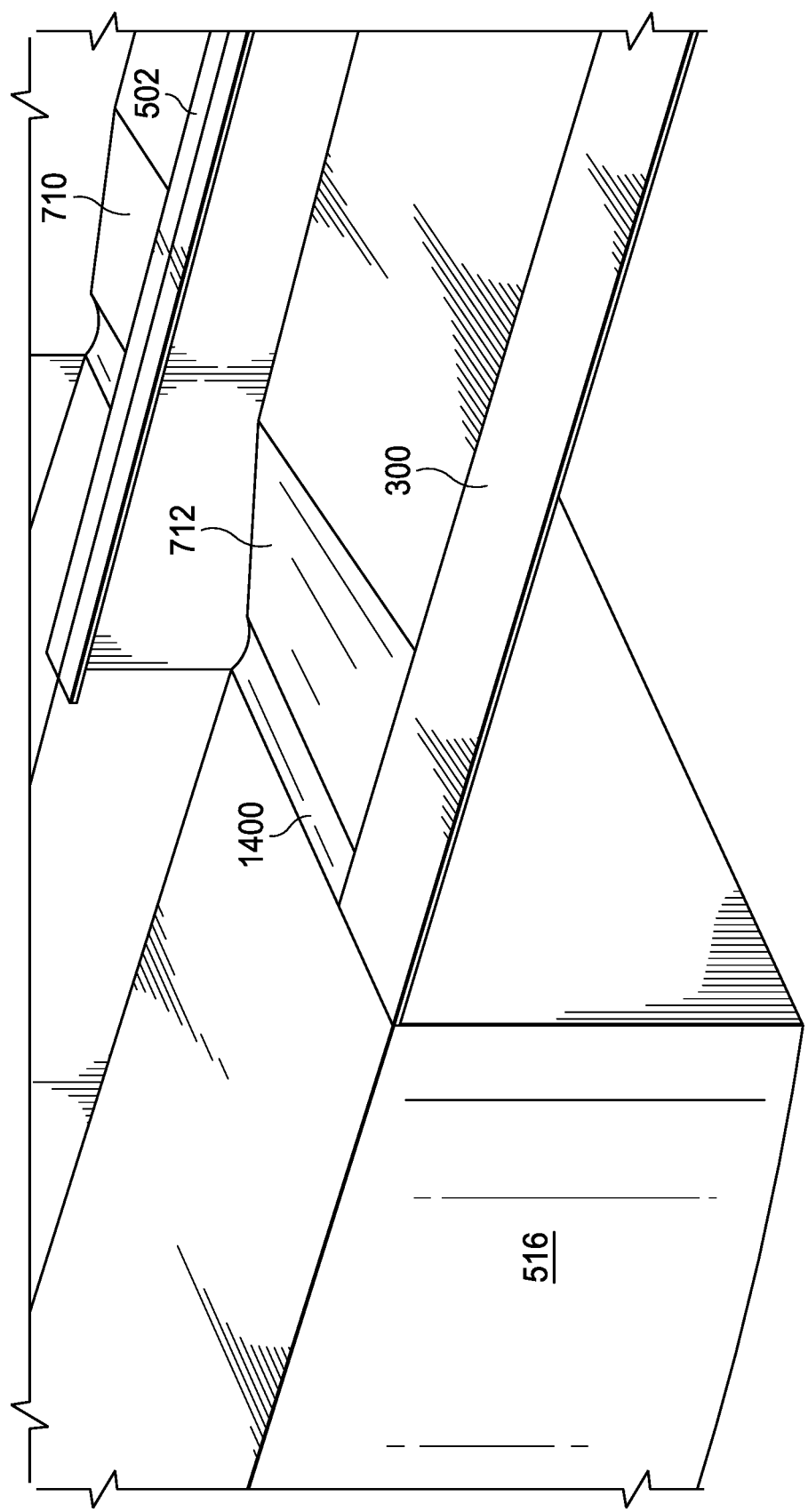
FIG. 14 is an illustration of an isometric view of a variable waterline pressure deck system in accordance with an illustrative embodiment.

FIG. 14 shows an isometric view of a variable waterline pressure deck system featuring a twisted panel depicted in accordance with an illustrative embodiment. The shape of twisted panel 712 is shown more clearly in this view. Gutter 1400 is also shown as a bridge between twisted panel 712 and rear spar 516.

Figure 15:
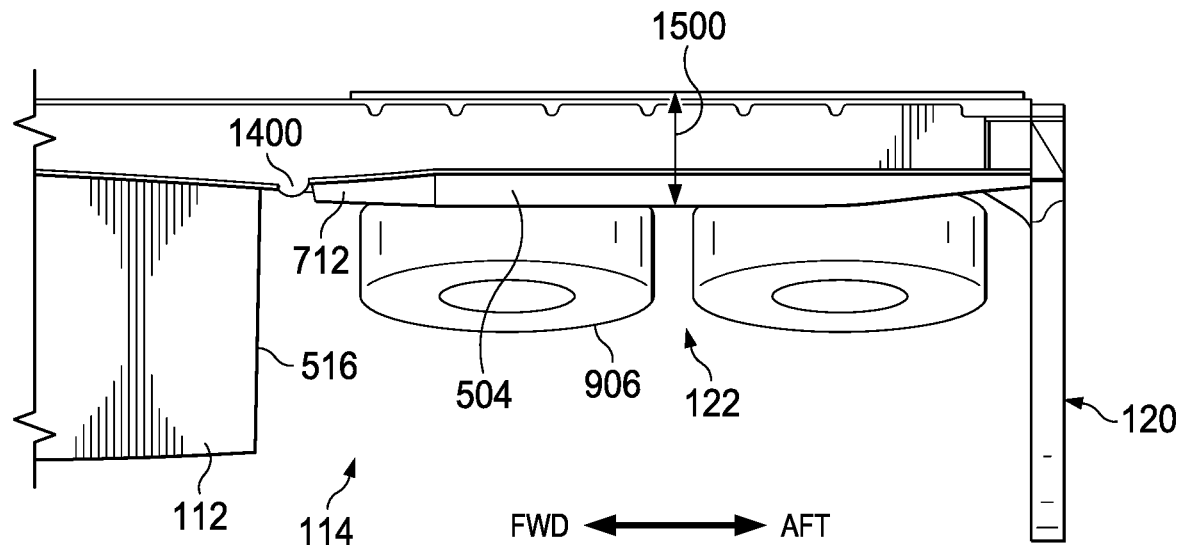
FIG. 15 is an illustration of a side view of a variable waterline pressure deck system in accordance with an illustrative embodiment.
Figure 16:
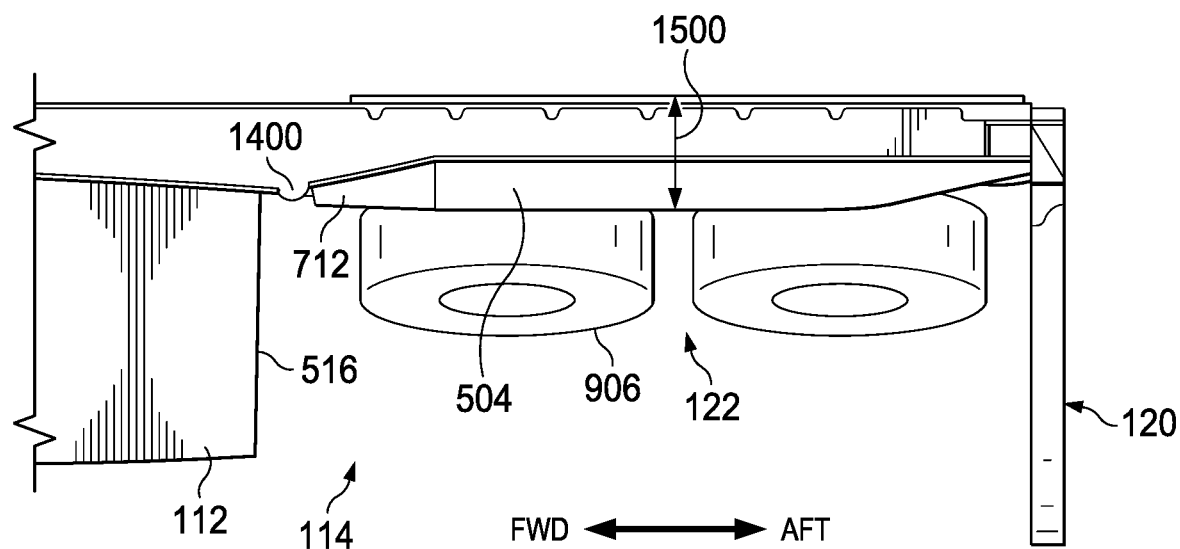
FIG. 16 is another illustration of a side view of a variable waterline pressure deck system in accordance with an illustrative embodiment.

Turning to FIG. 15 and FIG. 16, illustrations of a side view of a pressure deck system are depicted in accordance with an illustrative embodiment. FIG. 15 corresponds to the side view of FIG. 10, where longitudinal beams 502 have a height of 11 inches. FIG. 16 corresponds to the side view of FIG. 12, where longitudinal beams 502 have a height of 9 inches. Distance 1500 represents the distance between waterline 902 of cabin floor panels 406 and side-of-body waterline 900. Distance 1500 does not change as the architecture of variable pressure deck system 500 changes. Thus, the internal architecture of pressure deck system 500 and wheel well 114 can change without having to change existing manufacturing specifications and while still realizing load path, clearance, build efficiency and ergonomic advantages.

Aircraft 100 in FIG. 1 is only one physical implementation of a platform incorporating a variable pressure deck system 224 as shown in FIG. 2. Although the examples for an illustrative embodiment are described with respect to an aircraft, an illustrative embodiment may be applied to other types of platforms. Pressure deck system 224 may be used in any platform having pressurized and unpressurized compartments. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-16 may be combined with components in FIG. 2, used with components in FIG. 2, or a combination of the two. Additionally, some of the components in FIG. 1 and FIGS. 3-16 may be illustrative examples of how components shown in block form in FIG. 2 may be implemented as physical structures.

Figure 17:
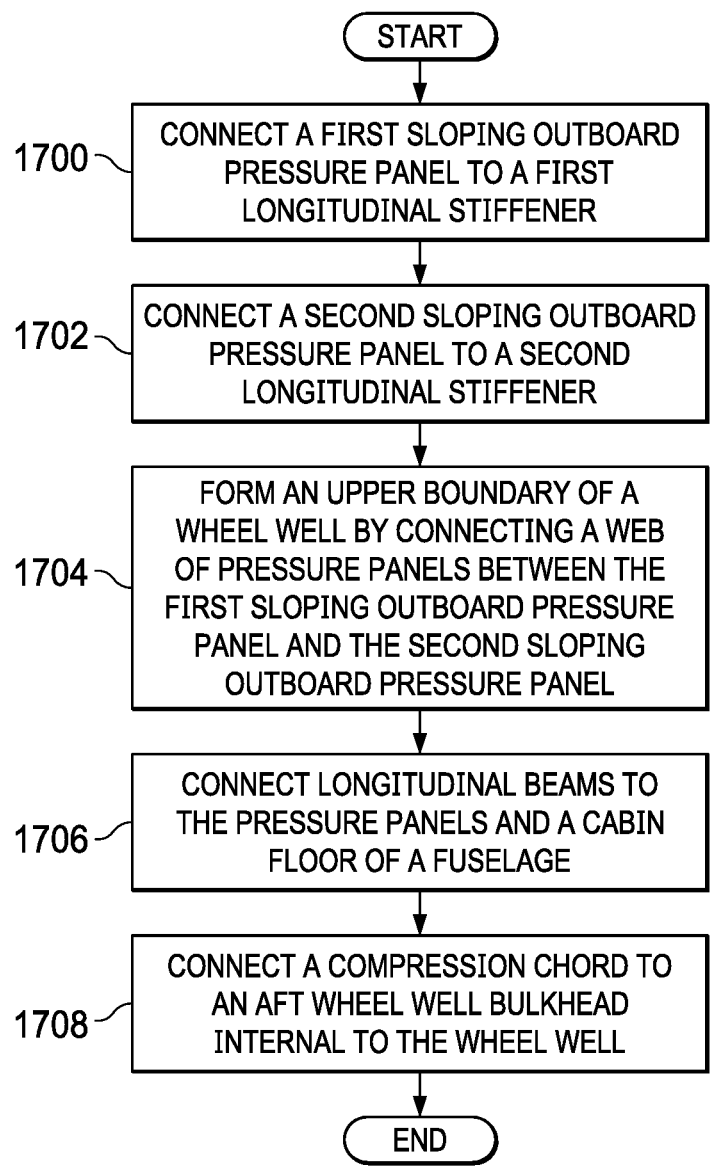
FIG. 17 is an illustration of a flowchart of a process for forming a pressure deck system for a wheel well in an aircraft in accordance with an illustrative embodiment.

With reference next to FIG. 17, an illustration of a flowchart of a process for controlling a pressure differential between a cabin and a wheel well in an aircraft is depicted in accordance with an illustrative embodiment. The method depicted in FIG. 17 is just one example of a method that may be used to install pressure deck system 224 of aircraft 200 shown in FIG. 2.

The process begins by connecting a first sloping outboard pressure panel to a first longitudinal stiffener (operation 1700). A second sloping outboard pressure panel is connected to a second longitudinal stiffener (operation 1702).

An upper boundary of a wheel well is formed by connecting a web of pressure panels between the first sloping outboard pressure panel and the second sloping outboard pressure panel (operation 1704). Longitudinal beams are connected to the pressure panels and a cabin floor of a fuselage (operation 1706). A compression chord is connected to an aft wheel well bulkhead internal to the wheel well (operation 1708), with the process terminating thereafter.

Additional support structures, heat shields, fasteners, splice angles, beams, or other structures may be connected to any or all the components in pressure deck system 224 in various ways and through various steps. The method disclosed in FIG. 17 is just one sequence of installation processes for a pressure deck system. The process described herein is not meant to be limiting.

Figure 18:
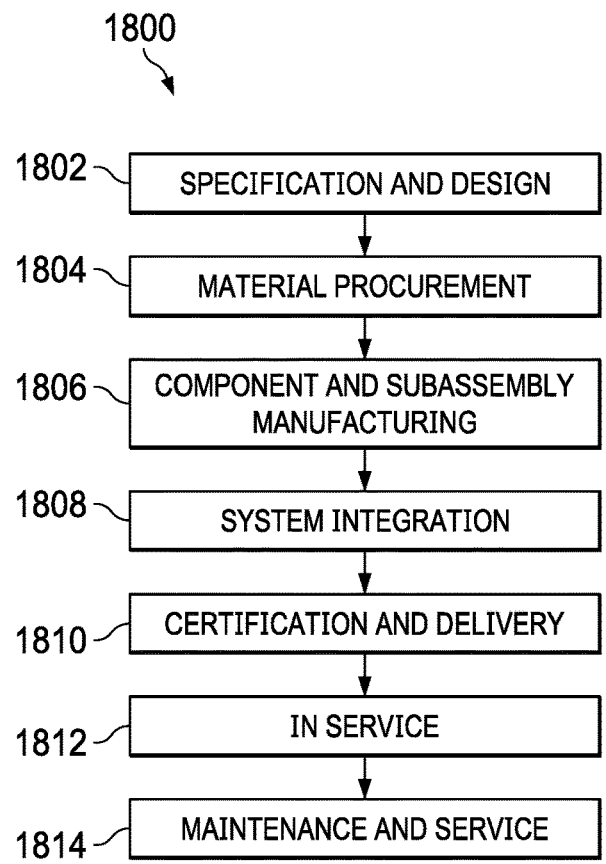
FIG. 18 is an illustration of a block diagram of an aircraft manufacturing and service method in accordance with an illustrative embodiment.
Figure 19:
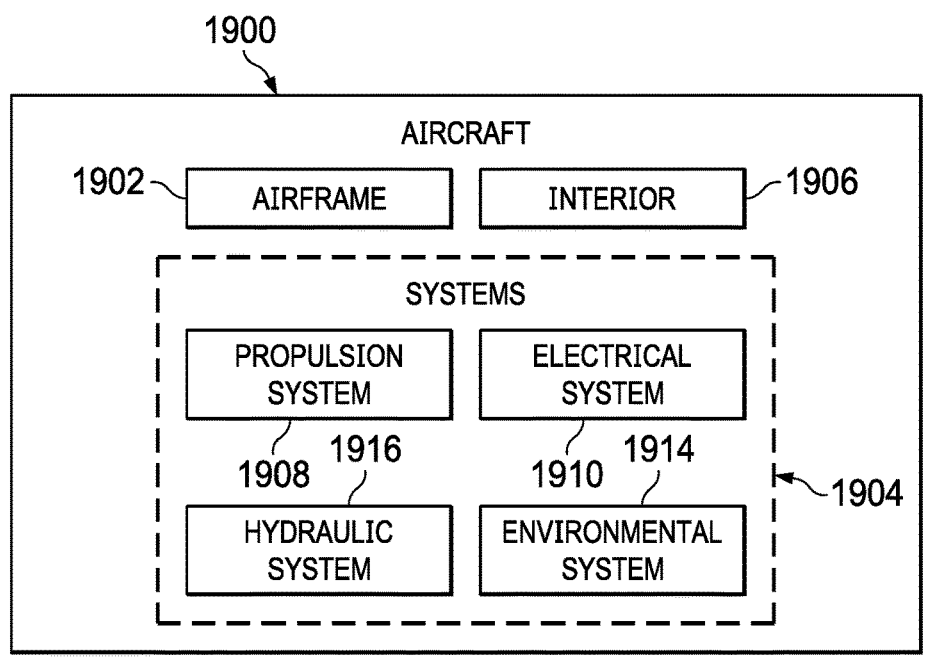
FIG. 19 is an illustration of a block diagram of an aircraft in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Pressure deck system 224 from FIG. 2 and the components within pressure deck system 224 may be made during component and subassembly manufacturing 1806. In addition, one or more components in pressure deck system 224 may be added during routine maintenance and service 1814 as part of a modification, reconfiguration, or refurbishment of aircraft 1900.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18.

One or more apparatus embodiments, method embodiments, or a combination thereof may be utilized while aircraft 1900 is in service 1812, during maintenance and service 1814 in FIG. 18, or both. The use of a number of the different illustrative embodiments may substantially expedite the assembly of aircraft 1900, reduce the cost of aircraft 1900, or both expedite the assembly of aircraft 1900 and reduce the cost of aircraft 1900.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The illustrative embodiments decrease the cost, complexity, and manpower needed to assemble fuselage 202 of aircraft 200. Pressure deck system 224 de-couples its waterline from the side-of-body waterline, providing numerous advantages discussed herein. The number of parts needed to assemble pressure deck system 224 and reinforce wheel well 210 to meet desired specifications is reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A pressure deck system for a fuselage of an aircraft comprising:
    a first sloping outboard pressure panel;
    a first longitudinal stiffener connected to both a side-of-body of the fuselage of the aircraft and to the first sloping outboard pressure panel;
    a second sloping outboard pressure panel opposite the first sloping outboard pressure panel;
    a second longitudinal stiffener connected to the second sloping outboard pressure panel;
    pressure panels between the first sloping outboard pressure panel and the second sloping outboard pressure panel, wherein the pressure panels form an upper boundary of a wheel well in the fuselage; and
    longitudinal beams connected to the pressure panels and a cabin floor of the fuselage of the aircraft;
    wherein the first sloping outboard pressure panel is positioned between the first longitudinal stiffener and a most outboard longitudinal beam of the longitudinal beams.

2. The pressure deck system of claim 1, wherein a waterline of the pressure deck system is de-coupled from a side-of-body waterline in the fuselage.

3. The pressure deck system of claim 2, wherein each of the pressure panels have an arched shape.

4. The pressure deck system of claim 3 further comprising:
    a sloping pressure deck connecting a rear spar of a center wing box of the aircraft to the first sloping outboard pressure panel, the second sloping outboard pressure panel, and the pressure panels.

5. The pressure deck system of claim 4 further comprising:

a first longitudinal beam inboard of a landing gear system in the wheel well that protrudes into the wheel well; and a second longitudinal beam inboard of the landing gear system that protrudes into the wheel well.

6. The pressure deck system of claim 5 further comprising:

a stub frame comprising beams having a stepped configuration, wherein each beam of the beams is connected to the most outboard longitudinal beam.

7. The pressure deck system of claim 1, wherein the upper boundary of the wheel well has an arched shape.

8. The pressure deck system of claim 1 further comprising:

a compression chord connected to an aft wheel well bulkhead and internal to the wheel well.

9. A method for controlling a pressure differential between a cabin and a wheel well in an aircraft, the method comprising:

connecting a first sloping outboard pressure panel to a first longitudinal stiffener, wherein the first longitudinal stiffener is connected to a side-of-body of a fuselage of the aircraft;

connecting a second sloping outboard pressure panel to a second longitudinal stiffener;

forming an upper boundary of the wheel well by connecting pressure panels between the first sloping outboard pressure panel and the second sloping outboard pressure panel; and connecting longitudinal beams to the pressure panels and a cabin floor of the fuselage of the aircraft, wherein the first sloping outboard pressure panel is positioned between the first longitudinal stiffener and a most outboard longitudinal beam of the longitudinal beams.

10. The method of claim 9, wherein a waterline of a pressure deck system is de-coupled from a side-of-body waterline in the fuselage.

11. The method of claim 9 further comprising:

connecting a sloping pressure deck to a rear spar of a center wing box of the aircraft and the first sloping outboard pressure panel, the second sloping outboard pressure panel, and the pressure panels.

12. The method of claim 11 further comprising:

connecting a first longitudinal beam inboard of a landing gear system in the wheel well such that the first longitudinal beam protrudes into the wheel well; and connecting a second longitudinal beam inboard of the landing gear system such that the second longitudinal beam protrudes into the wheel well.

13. The method of claim 9 further comprising:

connecting a compression chord to an aft wheel well bulkhead and internal to the wheel well.

14. An aircraft comprising:

an aft wheel well bulkhead forming an aft boundary of a wheel well for a landing gear system;

a rear spar of a center wing box forming a forward boundary of the wheel well; and a pressure deck system forming an upper boundary of the wheel well, the pressure deck system comprising:

a first sloping outboard pressure panel;

a first wheel well longeron connected to both a side-of-body of a fuselage of the aircraft and to the first sloping outboard pressure panel;

a second sloping outboard pressure panel opposite the first sloping outboard pressure panel;

a second wheel well longeron connected to the second sloping outboard pressure panel;

pressure panels having an arched shape and connected to the first sloping outboard pressure panel and the second sloping outboard pressure panel; and longitudinal beams connected to the pressure panels and a cabin floor of the fuselage of the aircraft;

wherein the first sloping outboard pressure panel is positioned between the first wheel well longeron and a most outboard longitudinal beam of the longitudinal beams.

15. The aircraft of claim 14, wherein a waterline of the pressure deck system is de-coupled from a side-of-body waterline in the fuselage.

16. The aircraft of claim 15, wherein the pressure deck system further comprises:

a sloping pressure deck connected to the rear spar of the center wing box of the aircraft and the first sloping outboard pressure panel, the second sloping outboard pressure panel, and the pressure panels.

17. The aircraft of claim 14, wherein the pressure deck system further comprises:

a first longitudinal beam inboard of the landing gear system that protrudes into the wheel well; and a second longitudinal beam inboard of the landing gear system that protrudes into the wheel well.

18. The aircraft of claim 17, wherein the pressure deck system further comprises:

a stub frame having a stepped configuration.

19. The aircraft of claim 14, wherein the upper boundary has an arched shape.

20. The aircraft of claim 14, wherein the pressure deck system further comprises:

a support structure internal to the wheel well, wherein the support structure connects the rear spar, a sloping pressure deck, and one of the longitudinal beams to at least one of the pressure panels.

* * * * *